United States Patent
Tamai et al.

(10) Patent No.: US 8,273,217 B2
(45) Date of Patent: *Sep. 25, 2012

(54) PAPER MACHINE FOR USED PAPER RECYCLING APPARATUS

(75) Inventors: Shigeru Tamai, Osaka (JP); Yuji Koyama, Osaka (JP)

(73) Assignee: Seed Company Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/971,090

(22) Filed: Jan. 8, 2008

(65) Prior Publication Data

US 2008/0210399 A1 Sep. 4, 2008

(30) Foreign Application Priority Data

Jan. 20, 2007 (JP) .................................. 2007-10902

(51) Int. Cl.
*D21F 1/24* (2006.01)
*D21F 9/02* (2006.01)

(52) U.S. Cl. ........................................ 162/289; 162/350

(58) Field of Classification Search .................. 162/147, 162/212, 336, 350, 289

See application file for complete search history.

(56) References Cited

U.S. PATENT DOCUMENTS 3,127,308 A * 3/1964 Justus et al. .................. 162/349
3,357,880 A * 12/1967 Curtis ........................... 162/344
4,141,388 A * 2/1979 Romanski et al. ...... 139/383 AA

FOREIGN PATENT DOCUMENTS

JP 06-134331 A 5/1994

OTHER PUBLICATIONS

Smook, Handbook for Pulp and Paper Technologists, 1992, Angus Wilde Publications, 2nd edition.*
Can-am Machinery, The Story of the Eagle Paper Machine [downlaoded online from www.canammachinery.com], downloaded on Jul. 20, 2009, whole document.*

* cited by examiner

*Primary Examiner* — Anthony Calandra
(74) *Attorney, Agent, or Firm* — Cheng Law Group, PLLC

(57) ABSTRACT

To present a paper manufacturing apparatus for used paper recycling apparatus small enough to be installed in a room of small shop or the like, friendly to the environment, low in running cost, and high in confidentiality. The paper manufacturing apparatus includes a paper making process unit for manufacturing wet paper from pulp suspension sent from a pulp making section in preceding process, the paper making process unit includes a paper making conveyor for manufacturing and conveying the pulp suspension, the paper making conveyor is composed of a mesh belt of paper making mesh structure of numerous mesh cells for filtering and dewatering the pulp suspension disposed so as to run straightly toward its running direction, and the paper making process length in the mesh belt is set in a range of straight running direction length of the mesh belt in the apparatus case of furniture size. As a result, a used paper recycling apparatus of small size and simple structure is realized.

14 Claims, 9 Drawing Sheets

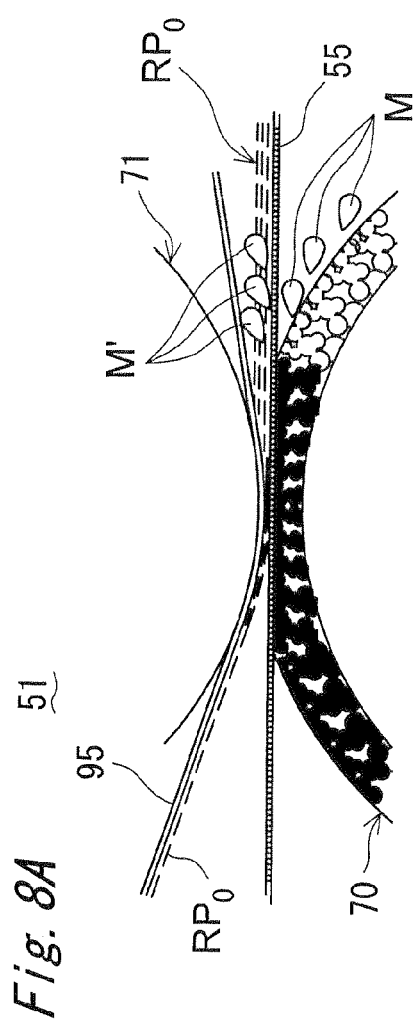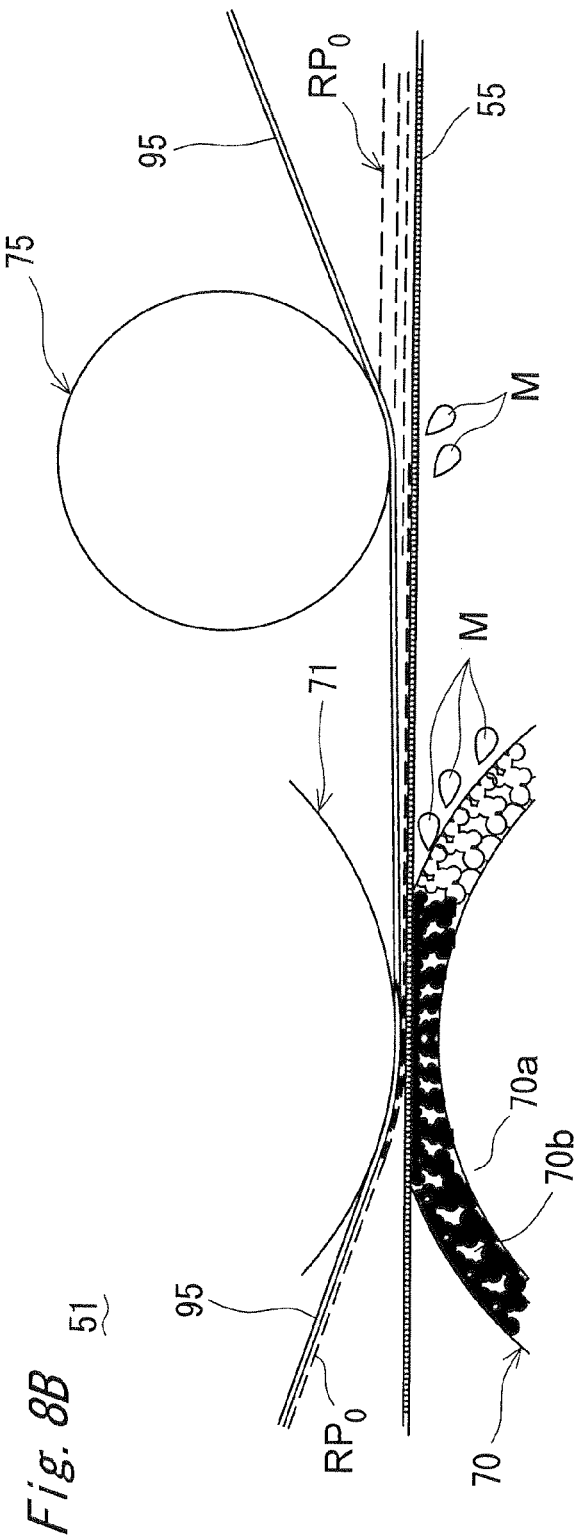

PAPER MACHINE FOR USED PAPER RECYCLING APPARATUS

BRIEF BACKGROUND OF THE INVENTION

1. Field of the Invention

The invention relates to a paper machine for used paper recycling apparatus, and more particularly to a paper machine for a used paper recycling apparatus of furniture size installed at the site of origin of used paper, for recycling and processing into reusable paper at the site without discarding the generated used paper, in which the slurry pulp suspension is manufactured into wet paper.

2. Description of the Related Art

Used paper of various types occurs not only in government offices or private companies, but also in daily life or general household. Used paper is usually discarded, incinerated, or disposed as refuse.

On the other hand, in the global concern about effective use of limited resources on earth, various technologies have been developed to regenerate and reuse the used paper being disposed and discarded so far.

Such used paper recycling technologies are mostly installed in paper making industry, and the used paper recycling plant requires, like the ordinary paper making plant, a vast land, an immense investment, and a huge quantity of water and chemicals for the purpose of high speed and mass production and high quality of recycled paper.

For recycling of used paper, a tremendous manual labor is needed for collecting used paper, and used paper collection involves various problems, such as mixing of foreign matter by garbage collectors, defective classification due to lack of knowledge about used paper recycling, and entry of harmful objects, and if used paper is collected, in order to recycle by 100 percent, final checking by specialists and cleaning works are needed. On the other hand, confidential documents are not easily recycled and are mostly incinerated, and the recycling rate is low.

To solve these problems of used paper recycling, an effective method is the technology capable of recycling at the site of origin of used paper, and from such point of view, a new system is proposed, for example, in Japanese Patent Application Laid-Open No. H6-134331.

This apparatus is a wet process shredder for shredding used paper into small pieces while adding a small mount of water, and shredded chips from the shredder are sent outside to a recycling plant, and used as material for recycled paper.

Shredded chips from the wet process shredder are deformed into pulp, and are not in the state of piece of paper, and a high confidentiality is guaranteed, and it is expected to promote recycling of confidential documents.

This wet process shredder is a giant machine installed in a wide space, and it can be used only in a large office consuming a great quantity of documents, and it is not suited to small office or general household not having enough space for installation and small in the quantity of output of used paper. If shredded chips may be used as material for recycled paper, processing is possible only in large recycling plant, and the recycling cost is high and it is not economical.

SUMMARY OF THE INVENTION

It is a primary object of the invention to present a novel used paper recycling apparatus capable of solving such conventional problems.

It is other object of the invention to present a paper machine for a used paper recycling apparatus of furniture size to be installed not only in a large office, but also in a small shop or a room in general household, friendly to the environment and low in running cost, capable of preventing leak of confidential information, private information, and other information, and keeping a high confidentiality.

It is another object of the invention to present a used paper recycling apparatus having such paper machine.

To achieve these objects, the paper machine of the invention is a paper machine constituting a used paper recycling apparatus of furniture size to be installed at the site of origin of used paper, for manufacturing recycled paper by making used paper pulp manufactured in pulp manufacturing apparatus in a preceding process, including a paper making section for making wet paper from slurry pulp suspension containing water and used paper pulp sent from the pulp manufacturing apparatus, in which the paper making section has a paper making conveyor for manufacturing and conveying pulp suspension, and this paper making conveyor is designed so that the mesh belt of mesh structure composed of numerous mesh cells for filtering and dewatering the pulp suspension may run straightly toward its running direction, and the paper making process length of the mesh belt is set within the length range of the straight running direction of the mesh belt in the apparatus case of furniture size.

Preferred embodiments include the following.

(1) The paper making process length of the mesh belt is determined in relation to the filtering and dewatering rate of the manufacturing mesh structure and the running speed of the mesh belt, so as to be sufficient for manufacturing the pulp suspension to a proper weight, and small enough so that the paper making conveyor having the mesh belt may be contained in the apparatus case of furniture size.

(2) The mesh belt is configured to run upward, obliquely, and straightly toward its running direction.

(3) The upward inclination angle of the mesh belt is set at 3 degrees to 12 degrees.

(4) The mesh size of the mesh belt is set at about 25 meshes to 80 meshes.

(5) The running speed of the mesh belt is set at 0.1 m/min to 1 m/min.

(6) The apparatus includes the paper making section for making wet paper from slurry pulp suspension containing water and used paper pulp sent from the pulp manufacturing apparatus, a drying section for drying the wet paper manufactured in the paper making section to obtain recycled paper, and a dewatering roll section for squeezing and dewatering the wet paper at the linking part of the paper making section and drying section, whereby the pulp suspension supplied from the pulp manufacturing apparatus is manufactured into wet paper, and is dewatered and dried.

(7) The paper making conveyor has the mesh belt of endless belt type for manufacturing and conveying the pulp suspension, and a drive motor for moving and driving the mesh belt.

(8) The paper making section is installed at starting end position of paper making process of the paper making conveyor, and includes a pulp feed unit for supplying the pulp suspension from the pulp manufacturing apparatus onto the paper making conveyor, and by this pulp feed unit, the pulp suspension is uniformly spread and supplied on the upside of the mesh belt of the paper making conveyor.

(9) The dewatering roll section is designed to squeeze, roll, and compress the mesh belt of the paper making section and the smooth surface belt of the drying section from both upper and lower sides, and squeeze and dewater the wet paper on the mesh belt.

(10) The dewatering roll section includes a dewatering roll for rolling on the mesh belt of the paper making section from the lower side, a press roll for rolling and pressing the smooth surface belt of the drying section from the upper side on this dewatering roll, and a drive motor for rotating and driving by rolling these two rolls, and by the two rolls driven and rotated by this drive motor, the mesh belt and smooth surface belt are squeezed, rolled and compressed from both upper and lower sides, and the moisture contained in the wet paper on the mesh belt is absorbed into the dewatering roll through the mesh belt.

(11) The drying section includes a smooth surface belt of endless belt type for receiving and conveying the wet paper manufactured and formed in the paper making section, and a drive motor for moving and driving this smooth surface belt, and the smooth surface belt has a smooth surface for smoothing the surface of the wet paper sent from the paper making section.

(12) The drying section includes a heating and drying section for heating and drying the wet paper on the smooth surface belt.

(13) The paper making section, dewatering roll section, and the drying section are driven by a common drive source.

The used paper recycling apparatus of the invention includes, in an apparatus case of furniture size, a pulp making section for manufacturing used paper pulp by macerating and mashing used paper, a paper making section for manufacturing recycled paper by making the used paper pulp manufactured in the pulp making section, and a control section for driving and controlling the pulp making section and paper making section by interlocking, and the paper making section is composed of the paper making apparatus of the invention.

"Mashing" is a process of controlling the fiber length by beating and grinding pulp fibers and fibrillating. "Inks" include printing inks for forming characters and patterns on the used paper by printing techniques, and inks forming characters and patterns on the used paper by pencil, ball-point pen, fountain pen, and other writing tools (these terms are meant the same throughout the specification and the claims).

The paper making apparatus of the invention includes a paper making section for manufacturing wet paper from slurry pulp suspension containing water and used paper sent from the pulp manufacturing apparatus in the preceding process, and this paper making section has a paper making conveyor for manufacturing and conveying the pulp suspension, and the paper making conveyor has a mesh belt of mesh structure composed of numerous mesh cells for filtering and dewatering the pulp suspension may run straightly toward its running direction, and the paper making process length of the mesh belt is set within the length range of the straight running direction of the mesh belt in the apparatus case of furniture size, and therefore according to the invention, the following outstanding effects are obtained, and the used paper recycling apparatus of the invention can be installed not only in a large office, but also in a small shop or ordinary household, and is friendly to the environment and low in running cost, and capable of preventing leak of confidential information, private information, and other information, and keeping a high confidentiality.

(1) The used paper recycling apparatus is a small and simple structure including, in an apparatus case of furniture size, a pulp making section for manufacturing used paper pulp by macerating and mashing used paper, and a paper making section (the paper manufacturing apparatus) for manufacturing recycled paper by making the used paper pulp manufactured in the pulp making section, and therefore without discarding the used paper, the used paper is recycled and reused at the same site of origin, and disposal of used paper is reduced, and refuse problems can be solved, and the limited resources can be utilized effectively.

Hitherto, because of confidential problems, recycling of used paper has not been promoted, but since the used paper can be recycled and reused at the same site of origin, effects of effective utilization of resources are outstanding.

(2) At the site of origin of used paper, a compact used paper recycling system having a same function as large scale system installed in paper making plant or used paper recycling plant is installed, and used paper can be recycled continuously in a closed circuit in a small shop or general household, and refuse collection and transportation expenses and incineration and other costs are saved, and it is very economical.

(3) Moreover, the apparatus structure is compact, and it can be installed not only in large office, but also in small shop or general household, and from this point of view, too, leak of confidential information and private information can be securely prevented.

(4) Being installed at the site of origin of used paper, the used paper is macerated into used paper pulp, and the paper making section manufactures this used paper pulp into recycled paper, and since the used paper is recycled and used as recycled paper within the site of origin, and information of characters and patterns printed on the paper is not diffused outside of the site of origin of used paper, and leak of confidential information and private information can be prevented securely, and a high confidentiality is assured and the resources can be utilized effectively.

That is, by using the used paper recycling apparatus including the paper manufacturing apparatus of the invention as the paper making section, it is free from risk of external diffusion of information from a specific institute (for example, school, hospital, city office, law firm, patent office, general household).

In other words, in the case of a conventional shredder, if the used paper is shredded into small chips, and the printed characters and patterns are not legible, the shredded chips are incinerated, and external diffusion cannot be prevented perfectly. In this regard, the waste chips may be stored within an internal warehouse, but storing place is needed, and the resources are used only once and are not utilized effectively.

By contrast, according to the used paper recycling apparatus of the invention, the information printed on the used paper is not diffused outside of the closed system, and the resources can be utilized effectively.

These and other features and objects of the invention will be more clearly appreciated and understood from the following detailed description given together with the accompanying drawings and novel facts disclosed in the claims.

BRIEF DESCRIPTION OF THE DRAWINGS

FIG. 8A is a block diagram of specific mechanism of squeezing and dewatering of dewatering roll in the paper making section, showing a basic squeezing and dewatering mechanism.

FIG. 8B is a block diagram of specific mechanism of squeezing and dewatering of dewatering roll in the paper making section, showing a squeezing and dewatering mechanism when the slurry preventive roll is provided near the upstream side of the dewatering roll.

DETAILED DESCRIPTION OF THE PREFERRED EMBODIMENT

Figure 1:
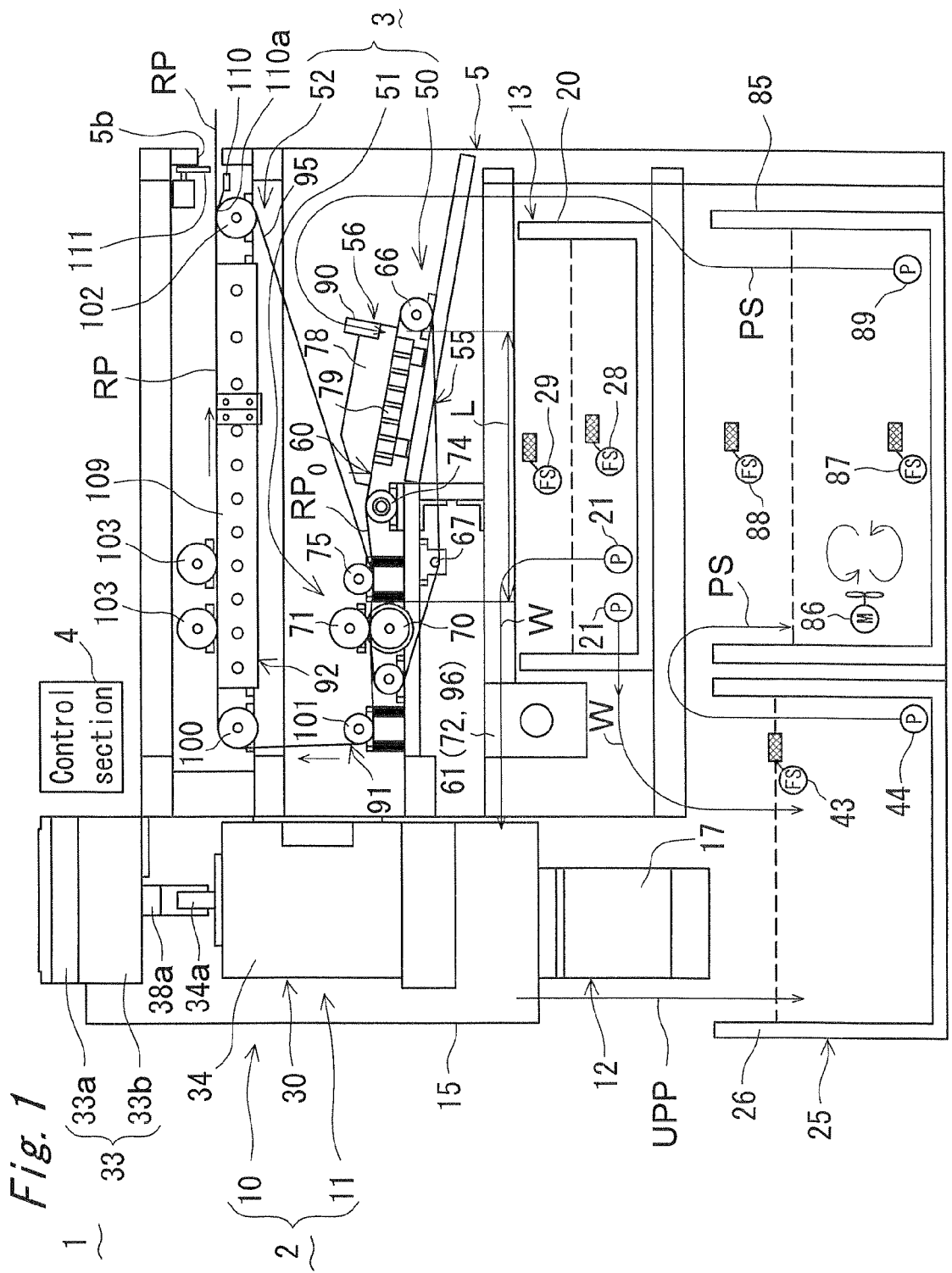
FIG. 1 is a front view of entire structure of used paper recycling apparatus in a preferred embodiment of the invention, showing a cut-away view of apparatus case.

A preferred embodiment of the invention is specifically described below while referring to the accompanying drawings. Throughout the drawings, same parts or elements are identified with same reference numerals.

The used paper recycling apparatus of the invention is shown in FIG. 1 to FIG. 9, in which the used paper recycling apparatus 1 is specifically installed at the site of origin of used paper, and is an apparatus for regenerating and processing into a reusable paper at the site without discarding the used paper UP, and such used paper UP includes confidential documents occurring in government offices and private companies, and private letters in general household, and other used and unnecessary documents.

Figure 9:
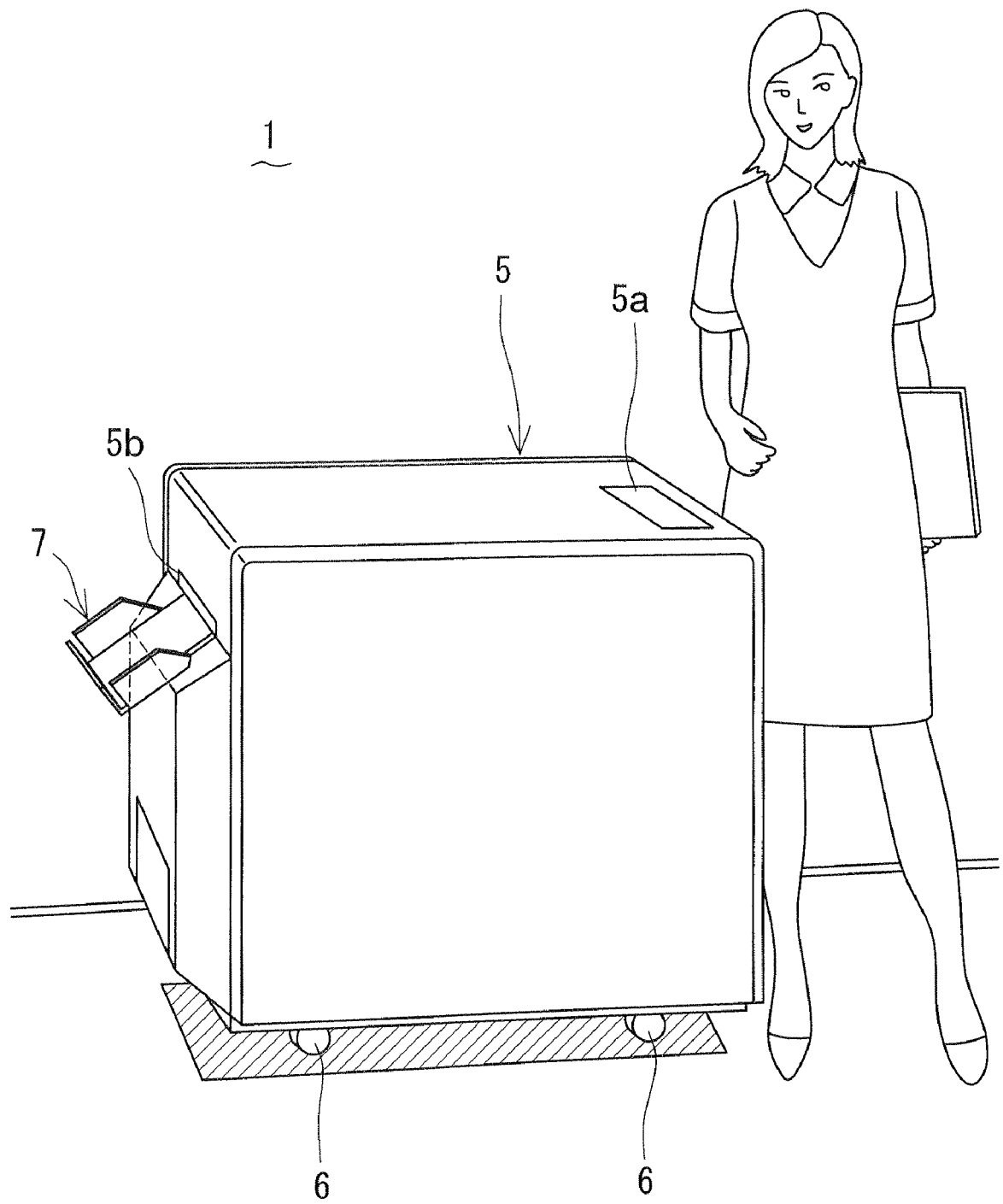
FIG. 9 is a perspective view of outline of used paper recycling apparatus of the invention.

The used paper recycling apparatus 1 has a furniture size as shown in FIG. 9, that is, size and shape similar to office equipment, such as document rack, locker, desk, copier, or personal computer, and is mainly composed of a pulp making section 2, a paper making section 3, and a control section 4 as shown in FIG. 1, and these sections 2 to 4 are contained in an apparatus case 5 in a compact design, and a drive source of the pulp making section 2 and paper making section 3 is a drive source driven by a general household alternating-current power source.

The apparatus case 5 has a furniture size as mentioned above, and the specific dimensions and shape are designed properly depending on the purpose and application. The apparatus case 5 in the illustrated preferred embodiment is a cubic box having dimensions and shape like a copier used in an office, casters 6, 6, ... are provided in the bottom as moving means so as to be moved freely on the floor. In the ceiling of the apparatus case 5, an inlet 5a is provided for supplying used paper UP, and a detachable recycled paper receive tray 7 is provided in the side surface for receiving recycled paper RP, RP, ... A discharge port 5b of the apparatus case 5 is provided oppositely to the recycled paper receive tray 7, and recycled paper RP, RP, ... discharged from the discharge port 5b are received sequentially in layers.

The pulp making section (pulp manufacturing apparatus) 2 is a process unit for manufacturing used paper pulp by macerating and mashing used paper UP, and is composed of a macerating unit 10 for agitating, grinding, and macerating the used paper UP, and a mashing unit 11 for mashing the used paper UP macerated in the macerating unit 10, and in the illustrated preferred embodiment, the macerating unit 10 and mashing unit 11 circulate the used paper UP for a specified time.

The macerating unit 10 includes an agitating device 12 for agitating the used paper UP, and a water feed unit 13 for supplying water into the agitating device 12.

Figure 2:
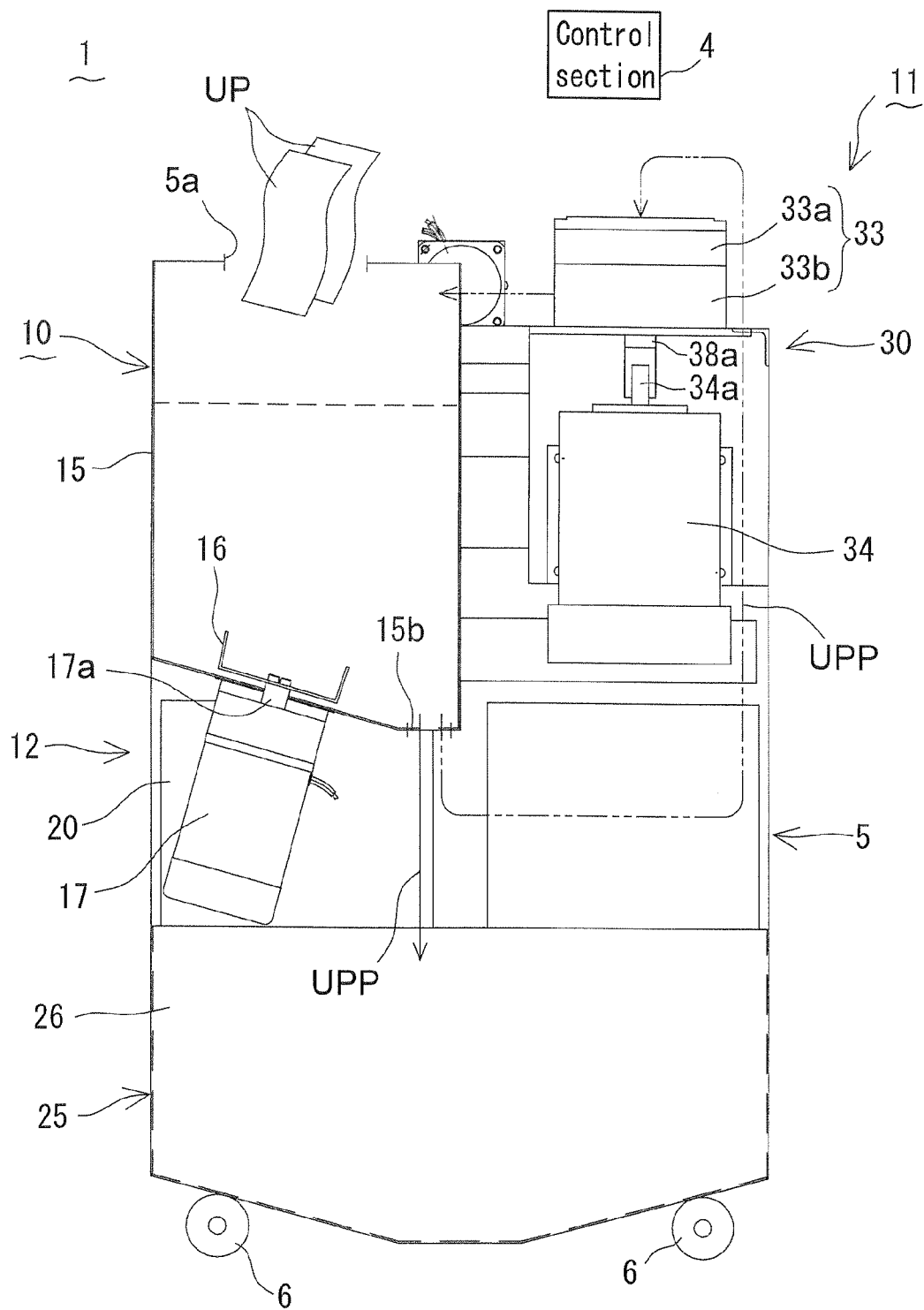
FIG. 2 is a side view of entire structure of the used paper recycling apparatus, showing a cut-away view of apparatus case.

The agitating device 12 includes an agitating tank 15, an agitating impeller 16, and a drive motor 17. The agitating tank 15 is shown in FIG. 2, in which a closable inlet 5a is provided outside of the apparatus case 5 in the ceiling wall, and the agitating impeller 16 is rotatably provided in the inside. The inner volume of the agitating tank 15 is determined depending on the number of sheets of used paper UP to be agitated in batch. In the illustrated preferred embodiment, the agitating tank 15 is supposed to have a capacity of agitating about 8 sheets (about 32 g) of used paper UP of A4 format plain paper copier (PPC) in batch process by adding about 1.5 liters of water.

The agitating impeller 16 is provided in an inclined bottom position of the agitating tank 15, and is driven by and coupled to a rotary shaft 17a (12a) of the drive motor 17, and is rotated normally and reversely by the drive motor 17 continuously or intermittently. The drive motor 17 is specifically an electric motor, and the drive motor 17 is electrically connected to the control section 4.

When the agitating impeller 16 is rotated normally and reversely, the used paper UP, if agitated in the size of A4 format, is effectively dispersed by the jet action of water by normal rotation followed by reverse rotation of the agitating impeller 17, and entangling on the agitating impeller 16 can be effectively prevented, and uniform macerating and mashing action of used paper UP, UP, ... is realized.

The water feed unit 13 is composed of white water collect tank 20 and water feed pump 21 as shown in FIG. 1. The white water collect tank 20 is designed to collect white water filtered and dewatered in the paper making section 3 (pulp water of ultralow concentration filtered by the paper making mesh in the paper making process), and the white water W collected in the white water collect tank 20 is supplied as water for agitation into the agitation tank 15 of the agitating device 12 by the water feed pump 21.

The water feed unit 13 also functions, as described below, as concentration adjusting water feeder (concentration adjusting water feeding means) of pulp concentration adjusting device (pulp concentration adjusting means) 25, and for this purpose, moreover, a concentration adjusting water feed pump 27 is provided for supplying the white water W in the white water collect tank 20 into the concentration adjusting tank 26 as water for adjusting the concentration. Reference numerals 28 and 29 are respectively lower limit water level float switch and upper limit water level float switch provided in the white water collect tank 20.

In the agitating device 12, the used paper UP, UP, ... supplied into the agitating tank 15 from the opening or inlet 5a of the apparatus case 5 is agitated for a specific time (3 to 5 minutes in the shown case) in water W supplied from the water feed unit 13 by normal and reverse rotation of the agitating impeller 16 by the drive motor 17, and macerated and mashed, and transformed into used paper pulp UPP.

The mashing unit 11 has at least one mashing machine, and one mashing machine 30 is shown in the illustrated preferred embodiment.

The mashing machine 30 pressurizes and mashes the used paper UP macerated in the macerating unit 10, and grinds and pulverizes the inks forming characters and patterns on the used paper UP.

Figure 3:
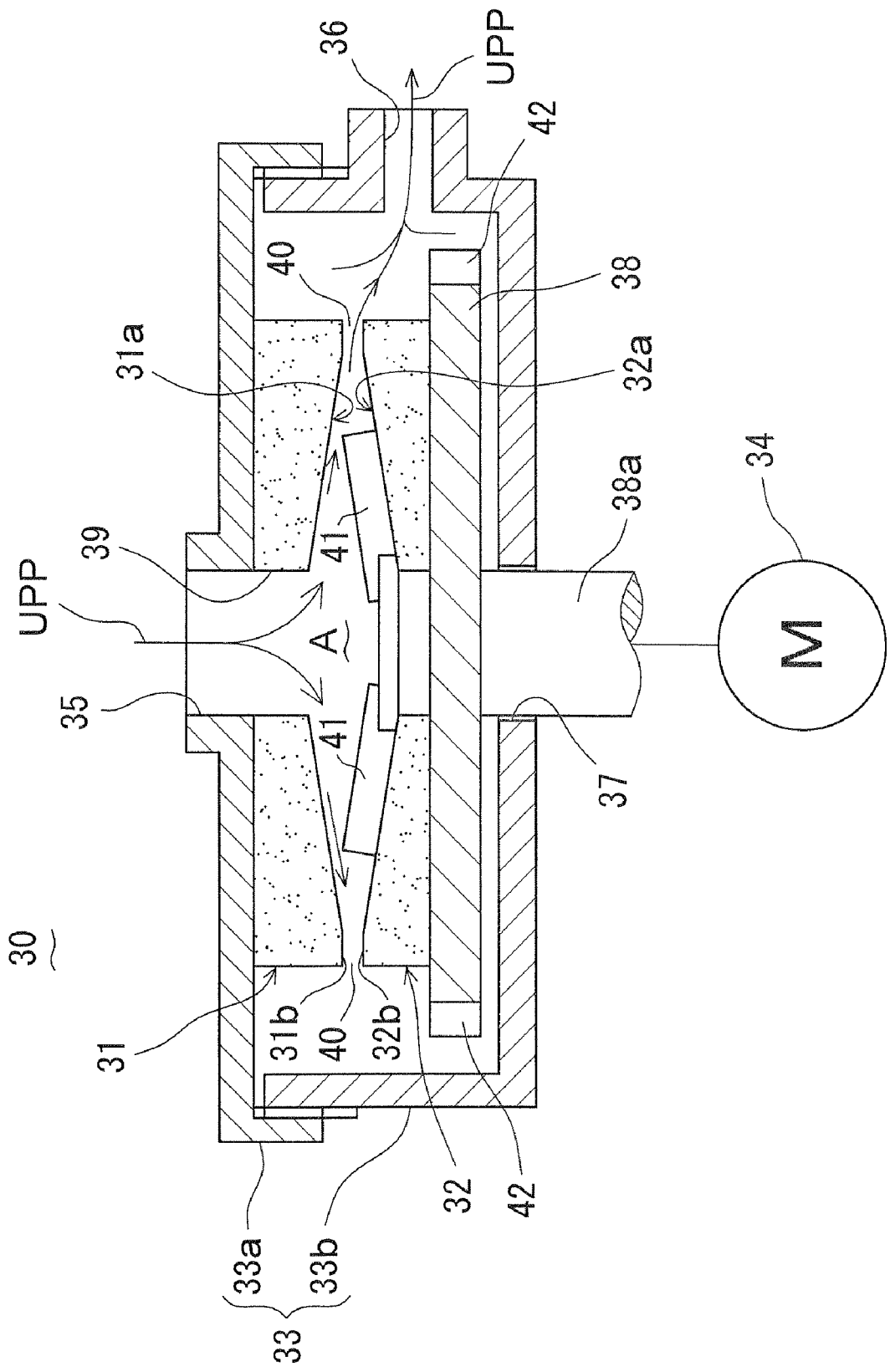
FIG. 3 is a front sectional view showing essential parts of mashing unit of pulp making section in the used paper recycling apparatus.

The mashing machine 30 is, as shown in FIG. 3, mainly composed of a plurality of (two in this case) relatively moving mashing members 31, 32 disposed oppositely across a tiny mashing clearance, and specifically includes a mashing tank 33 communicating with the agitating tank 15 of the macerating unit 10, the mashing members 31, 32 provided relatively movably in the mashing tank 33, and a drive source 34 for driving the mashing members 31, 32 relatively.

In the shown mashing machine 30, though not specifically shown in the drawing, the mashing members 31, 32 are relatively moving disks, and more specifically the upper mashing member 31 is fixed, and the lower mashing member 32 is rotatable.

The mashing tank 33 has an upper and lower divided structure so as to contain the pair of mashing members 31, 32 in a closed cylindrical shape, with the upper tank 33a and lower tank 33b mutually engaged. The mashing tank 33 has a feed port 35 opened in the center of the ceiling of the upper tank 33a, and a discharge port 36 opened in the cylindrical side of the lower tank 33b, and the feed port 35 and discharge port 36 are connected to communicate with the agitating tank 15 of the macerating unit 10 by way of piping not shown. Although not shown specifically, the feed port 35 communicates with the bottom position of the agitating tank 15, and the discharge port 36 communicates with the upper position of the agitating tank 15.

The upper fixed side mashing member 31 is fixed to the ceiling inner side of the upper tank 33a by proper fixing means, and the lower rotatable mashing member 32 is provided oppositely to the fixed side mashing member 31 concentrically across a tiny mashing clearance A.

The rotatable mashing member 32 provided integrally on a rotary bench 38, and a rotary support shaft 38a of the rotary bench 38 is opposite to the outside of the mashing tank 33 by way of the opening 37 in the bottom of the mashing tank 33, and is directly fixed to the rotary shaft 34a of the drive motor 34 as the rotary drive source in a direct motor structure. This drive motor 34 is specifically an electric motor, and the drive motor 34 is electrically connected to the control section 4.

The opposite sides 31a, 32a of both mashing members 31, 32 forming the tiny mashing clearance A cooperate and form mashing action surfaces. These opposite mashing action surfaces 31a, 32a are grindstone surfaces having multiple abrasive grains coupled by a binding material, and these two mashing action surfaces 31a, 32a are formed in a taper shape gradually increased in diameter toward the mutually opposite directions as shown in FIG. 3, and the mashing clearance A of conical shape is formed between them.

In the central position of mashing action surface 31a of the fixed side mashing member 31, an inlet 39 is formed to communicate concentrically with the feed port 35 of the mashing tank 33, and an annular clearance 40 formed between outer peripheral edges 31b, 32b of mashing action surfaces 31a, 32a of the two mashing members 31, 32 is formed as an outlet communicating with the discharge port 36 of the mashing tank 33.

In this relation, a plurality of guide ribs 41, 41, . . . are provided in the mashing action surface 32a of the rotary mashing member 32 at equal intervals in the circumferential direction, and a plurality of blades 42, 42, . . . are provided on the outer circumference of the rotary bench 38 for supporting the rotary mashing member 32 at equal intervals in the circumferential direction.

By rotation of the rotary mashing member 32, the plurality of guide ribs 41, 41, . . . act to guide the used paper pulp UPP flowing into the mashing clearance A from the inlet 39 into the outlet 40, and the plurality of blades 42, 42, . . . act as pump for forcing out the used paper pulp UPP flowing in from the outlet 40 toward the discharge port 36 of the mashing tank 33 by centrifugal force.

The gap of the mashing clearance A is set at about 0.05 to 0.8 mm. The gap of the mashing clearance A can be finely adjusted by relatively rotating the upper tank 33a and lower tank 33b of the mashing tank 33, and moving back and forth the engaged portion. As the gap of the mashing clearance A is finely adjusted depending on the purpose, and high pressure and sliding force depending on the strength and driving force of the apparatus mechanical structure can be obtained in the cooperating action of the mashing action surfaces 31a, 32a. Also by adjusting the gap of the mashing clearance A, the mashing speed of the mashing unit 11 (mashing time) can be also adjusted properly.

In the state of the rotary mashing member 32 rotated and driven on the fixed mashing member 31 by the drive motor 34, the used paper pulp UPP supplied into the feed port 35 of the mashing tank 33 from the agitating tank 15 of the macerating unit 10 flows into the mashing clearance A from the inlet 39, passes through the mashing clearance A, receives the pressurizing and mashing action by the mashing action surfaces 31a, 32a rotating relatively, and returns to the agitating tank 15 from the outlet 40 by way of the discharge port 36 of the mashing tank 33 (see the flow path indicated by arrow in FIG. 3).

The feed port 35 and discharge port 36 of the mashing tank 33 are opened and closed by opening means. Specific structure of opening means is not shown, but any conventional manual or automatic opening valve may be used. The opening valve closes the feed port 35 and discharge port 36 when the operation of the mashing unit 11 is stopped, thereby preventing entry of used paper UP or used paper pulp UPP into the mashing tank 33 from the agitating tank 15 of the agitating device 12, and opens the feed port 35 and discharge port 36 when the operation of the mashing unit 11 is started, thereby allowing circulation of used paper UP or used paper pulp UPP between the agitating tank 15 and the mashing tank 33.

In this case, when the macerating unit 10 and mashing unit 11 are driven at the same time, the mashing tank 33 constitutes a pulp circulation tank for allowing circulation of used paper pulp UPP together with the agitating tank 15 of the macerating unit 10, and the used paper pulp UPP flowing and circulating through the circulation tanks 10, 23 receives the agitating and maceration action by the macerating unit 10, and the pressurizing and mashing action and ink grinding and pulverizing action by the mashing unit 11 sequentially and repeatedly. As a result, an appropriate paper strength is obtained for recycled paper RP to be made and regenerated in the paper making section 3 in a later process, and a recycled paper RP of high degree of whiteness is obtained (same effect as in de-inking process).

The pulp concentration adjusting unit 25 is provided at the downstream side of the agitating tank 15, and is designed for properly adjusting the concentration of used paper pulp UPP manufactured in the agitating tank 15. The pulp concentration adjusting unit 25 includes a concentration adjusting tank 26 for storing the used paper pulp UPP manufactured in the agitating tank 15, and a concentration adjusting water feed unit for supplying water into the concentration adjusting tank 26, and the water feed unit 13 functions also as the concentration adjusting water feed unit.

The inner volume of the concentration adjusting tank 26 is determined depending on the number of sheets (weight) of used paper UP to be processed in batch in the agitating device 12. In the illustrated preferred embodiment, the concentration adjusting tank 26 is supposed to have a volume enough to adjust the concentration of used paper pulp UPP corresponding to the capacity of batch processing of about 8 sheets (about 32 g) of used paper UP of A4 format as stated above.

In this relation, a drain port 15b is provided in the bottom of the agitating tank 15 of the agitating device 12, and the drain port 15b is opened and closed by drain valve not shown in the drawing. The drain valve is specifically an electromagnetic valve, and is electrically connected to the control section 4.

A specific concentration adjusting method of the pulp concentration adjusting unit 25 is explained, that is, in the concentration adjusting tank 26, water W is added from the concentration adjusting water feed unit 13 to the whole volume of used paper pulp UPP manufactured in batch process in the agitating tank 15, until the total volume of used paper pulp UPP and water W becomes a specified amount, and pulp suspension PS of specified concentration is prepared. The target concentration of the pulp suspension PS to be adjusted is determined in consideration of paper making capacity of the paper making section 3 specified below, on the basis of the data of preliminary experiments, and it is set at concentration of about 0.1% in the shown example. Reference numeral 43 is a float switch provided in the concentration adjusting tank 26, and it detects the water level when the amount of pulp suspension PS in the concentration adjusting tank 26 (total volume of used paper pulp UPP and water W) becomes the specified amount.

Therefore, in the concentration adjusting tank 26, the whole volume of used paper pulp UPP manufactured in the agitating tank 15 (and mashing tank 33) is dropped and supplied by gravity into the concentration adjusting tank 26 from the drain port 15b of the agitating tank 15, and white water W added to the used paper pulp UPP from the concentration adjusting water feed unit 13 up to the specified value (detected by the float switch 43), and the concentration of the used paper pulp UPP is adjusted, and pulp suspension PS of specified concentration is obtained.

In the illustrated preferred embodiment, in the whole volume of used paper pulp UPP (about 32 g of used paper UP+1.5 liters of water W), water W for dilution is added from the concentration adjusting feed unit 13, and it is controlled so that the total volume (total weight) of used paper pulp UPP and water W may be 32 liters, and pulp suspension PS of concentration of about 0.1% (target concentration) is prepared. This pulp suspension PS of adjusted concentration is sent into pulp feed tank 85 of paper making section 3 in next process by means of first suspension feed pump 44 (31).

While the used paper pulp UPP is dropped and supplied into the concentration adjusting tank 26 from the drain port 15b of the agitating tank 15, water W is supplied by water feed pump 21 from the water feed unit 13, and the agitating impeller 16 is rotated by the drive motor 17, and the inside of the agitating tank 15 is cleaned.

The water feed source of the water feed unit 13 is the white water W dewatered in the paper making section 3 collected in the white water collect tank 20, and, in other words, the whole white water W dewatered and collected in the paper making section 3 is circulated and reused in the agitating device 12 and pulp concentration adjusting unit 25 in the mashing unit 10.

The paper making section (paper making device) 3 is a process unit for manufacturing recycled paper RP from the used paper pulp UPP manufactured in the mashing unit 10, and includes a paper making process unit 50, a dewatering roll unit 51, and a drying process unit 52.

The paper making section 3 is the most important component of the used paper recycling apparatus 1, and its constituent devices 50 to 52 have the following characteristic features as explained below in order to realize paper making for manufacturing recycled paper conventionally possible only in a huge used paper recycling plant, in the apparatus case 5 of small size (furniture size) such as copier installed in a small space of an office or the like.

The paper making process unit 50 is a location for manufacturing wet paper from slurry pulp suspension PS of water W and used paper pulp UPP sent from the mashing unit 10 of the pulp making section 2, and includes mainly a paper making conveyor 55 and a pulp feed unit 56.

The paper making conveyor 55 is for conveying the pulp suspension while processing, and is specifically a mesh belt 60 (45) of paper making mesh structure composed of numerous mesh cells for filtering and dewatering the pulp suspension PS, being disposed straightly toward its running direction.

Specifically, the paper making conveyor 55 has the mesh belt 60 (45) formed as an endless belt for manufacturing and conveying the pulp suspension PS, and a drive motor 61 (46) for driving and moving this mesh belt 60.

The mesh belt 60 is an endless belt having plate members of paper making mesh structure of specified width connected in a ring form of specified length.

The plate members of paper making mesh structure for composing the mesh belt 60 are made of materials capable of filtering and dewatering the pulp suspension PS appropriately through innumerable mesh cells of paper making mesh structure, and preferred examples include polypropylene (PP), polyethylene terephthalate (PET), polyamide (PA) (generally known by the registered trade name of Nylon), and stainless steel (SUS), and other materials excellent in corrosion resistance, and in the illustrated preferred embodiment, the mesh belt 60 is made of PET excellent in heat resistance.

The paper making mesh structure of the mesh belt 60 is preferred to be fine in mesh size, or fine and smooth in woven texture, and especially the following points are taken into consideration depending on the properties of the paper.

(1) Mesh Size of Mesh Belt 60

The mesh size of mesh belt 60 is preferably 25 meshes to 80 meshes, and the mesh belt 60 of 50 meshes is used in the illustrated preferred embodiment.

(2) Wire Diameter of Mesh of Mesh Belt 60

The mesh of the mesh belt 60 is defined not only by the number of mesh cells (size), but also by the wire diameter of the mesh. If the number of mesh cells is the same, in a thick wire diameter, the mesh size is smaller, and in a thin wire diameter, the size is large, and it expressed by the voids of the mesh, or permeability for passing the air ($cm^3/cm^2/sec$).

If the mesh size is fine and the permeability is poor, water filtering rate is also low, and a paper making frame body 78 of the pulp feed unit 56 is extended in the running direction of mesh belt 60, and the apparatus is increased in size. To the contrary, if the mesh is coarse and the permeability is too high, the paper making frame body 78 is shorter and the apparatus size is smaller, but the regenerated recycled paper PP is rough in texture, and the smoothness difference between obverse and reverse sides of the paper is large, and the paper smoothness is poor.

(3) Woven Structure

Weaving methods of meshes of the mesh belt 60 include single weaving, double weaving, and changing of warp diameter and weft diameter, but in multiple weaving, however, since the roll diameter for supporting the rotation of the mesh belt 60 is increased and the apparatus size is increased, and hence the mesh belt 60 of single weaving is used in the illustrated preferred embodiment.

Considering these conditions, the mesh belt 60 is desired to be a reticular structure fine in wire diameter of mesh, large in the number of mesh cells, and high in permeability, so as to prevent the used paper pulp UPP from being slipping out of the meshes of the mesh belt 60 in the paper making process, and the mesh belt 60 in the illustrated preferred embodiment is a plain-woven PET mesh belt 60 of 50 meshes. By using this mesh belt 60, it has been experimentally known that a high paper quality favorable for writing is obtained.

The width dimension of the mesh belt 60 is set at a specified width slightly larger than the width dimension of the recycled paper RP to be manufactured from the pulp suspension PS.

Figure 4:
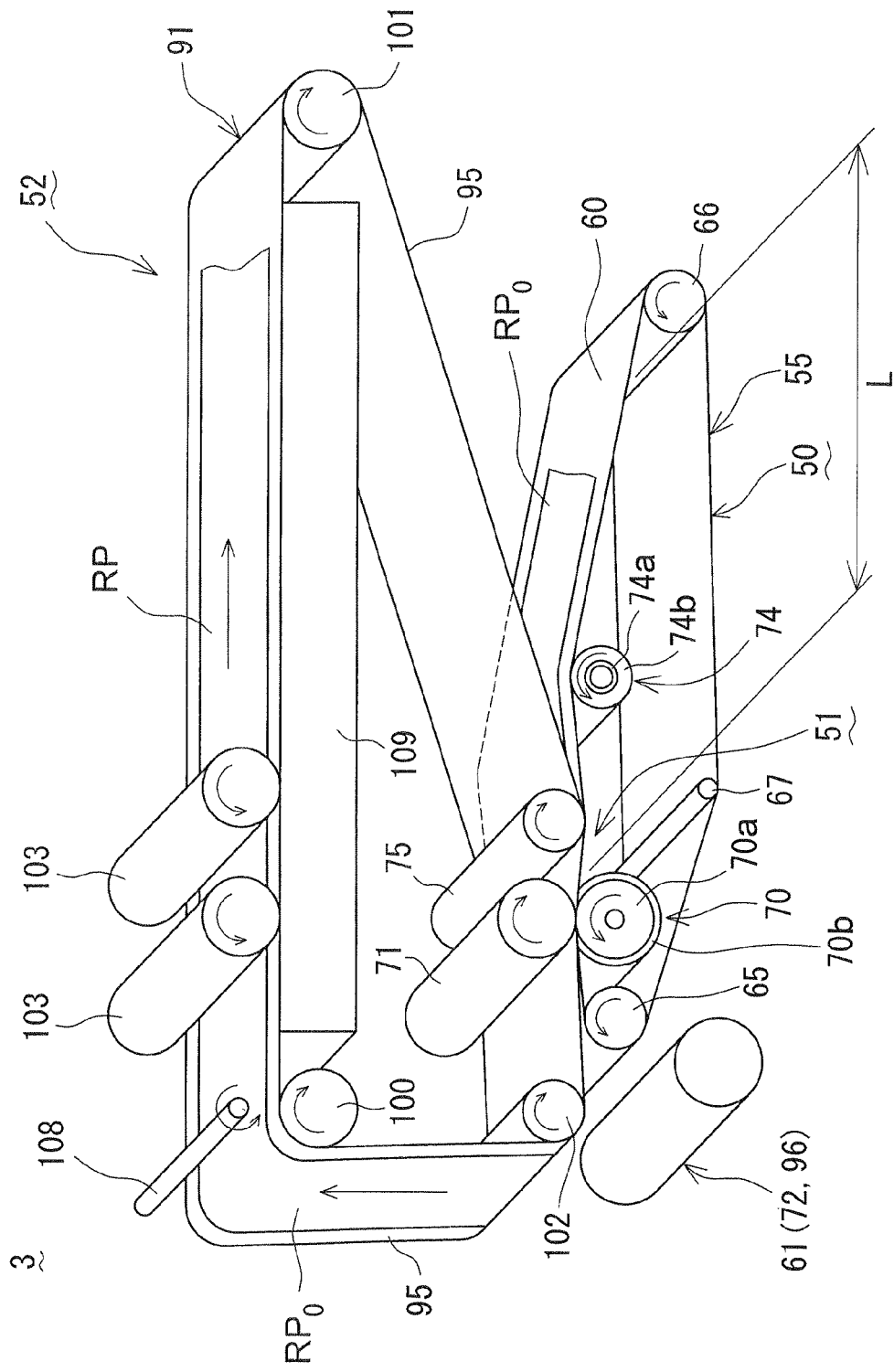
FIG. 4 is a perspective view of outline of paper making section of the used paper recycling apparatus.
Figure 5:
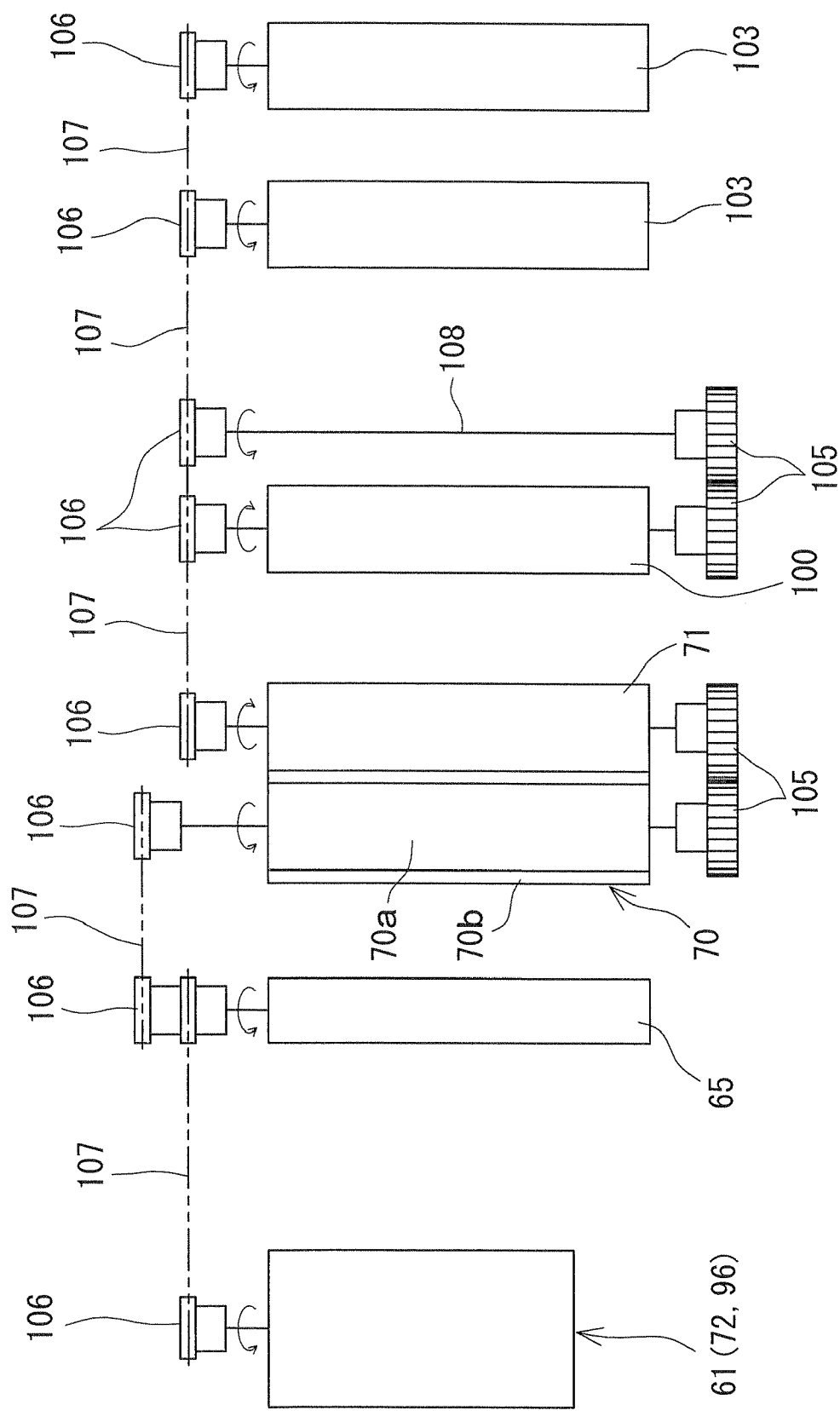
FIG. 5 is a plan view of drive coupling mechanism in the paper making section.

The mesh belt 60 is rotatably suspended and supported, as shown in FIG. 1 and FIG. 4, by way of drive roller 65, follower roller 66, support roller 67, dewatering roll 70, and preliminary dewatering roll 74, and is driven by and coupled to the drive motor 61 through the drive roller 65.

The paper making process length L in the mesh belt 60 is determined in a range of linear running direction length of mesh belt 60 (lateral direction length in FIG. 1 and FIG. 4) in the apparatus case 5 of furniture size.

Specifically, the paper making process length L in the mesh belt 60 is set to be sufficient for manufacturing the pulp suspension PS in a proper weight in relation to the filtering and dewatering rate of the paper making mesh structure and the running speed of mesh belt 60, and appropriate for accommodating the paper making conveyor 55 having the mesh belt 60 in the apparatus case 5 of furniture size.

The running speed of the mesh belt 60 is determined in consideration of the above conditions, and is preferably set at about 0.1 m/min to 1 m/min, and it is set at 0.2 m/m in the illustrated preferred embodiment. Incidentally, in the conventional large-scale used paper recycling plant, the running speed of such mesh belt is at least 100 m/min, or more than 1000 m/min in faster version.

The running speed of the mesh belt 60 is related to the weight of wet paper in the paper making process, and the weight increases when the running speed of the mesh belt 60 declines, and the weight decreases when the running speed picks up. In this case, the mashing rate of used paper pulp UPP is related to the filtering of the mesh belt 60, and a constant weight is obtained if the mashing degree and pulp concentration are constant.

Relating to these design conditions of the mesh belt 60, as shown in FIG. 1 and FIG. 4, the mesh belt 60 is disposed to run upward obliquely and straightly toward its running direction, and the paper making process length L in a limited space of installation is considerably extended, and the filtering and dewatering efficiency is enhanced in relation to the paper making mesh structure of mesh belt 60. The upward inclination angle a of the mesh belt 60 is determined depending on the purpose, and is preferably set at 3 degrees to 12 degrees, and it is set at 6 degrees in the illustrated preferred embodiment.

The drive motor 61 for driving the mesh belt 60 is specifically an electric motor, and is connected electrically to the control section 4. The drive motor 61 is also used as drive source of dewatering roll unit 51 and drying process unit 52, and the structure for common use is described below as drive coupling mechanism.

The pulp feed unit 56 is a location for supplying pulp suspension PS from the mashing unit 10 of pulp making section 2 onto the mesh belt 60, and specifically the pulp feed unit 56 supplies and spreads the pulp suspension PS uniformly on the upper surface of the mesh belt 60. The paper making process unit 50 is provided at a starting end position of paper making process of the paper making conveyor 55.

Figure 6:
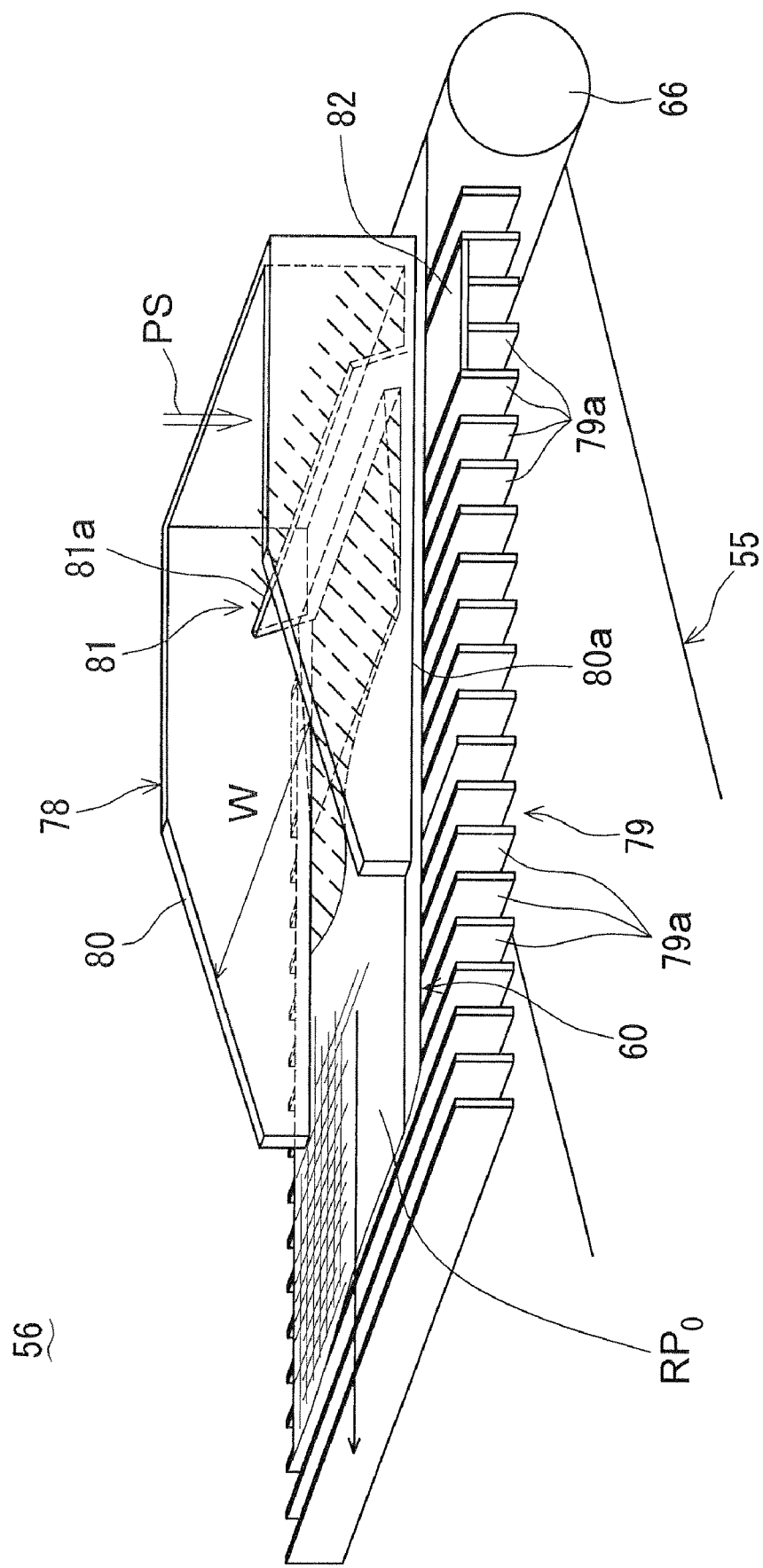
FIG. 6 is a magnified perspective view of configuration of pulp feeder in the paper making section.

A specific structure of the pulp feed unit 56 is shown in FIG. 6, FIG. 8A and FIG. 8B. In this pulp feed unit 56, the mesh belt 60 is disposed in an upward slope toward the running direction, and a paper making frame 78 and a partition member 79 are disposed at upper and lower side positions of the mesh belt 60.

The paper making frame 78 is slidably disposed on the upside of the mesh belt 60, and, as shown in FIG. 6, FIG. 8A and FIG. 8B, includes a main body frame 80 of U shape plane opened at the leading end, that is, the running direction end of the mesh belt 60, and an overflow tank 81 provided at the rear end of the main body frame 80.

The main body frame 80 is disposed so that its lower end 80a may slide on the upside of the mesh belt 60 running obliquely, and the frame inner width W (see FIG. 6) of main body frame 80 is set in a width dimension of recycled paper PR to be manufactured.

The overflow tank 81 is integrally fixed to the rear end of the main body frame 80, and its front wall upper edge 81a is the overflow portion formed horizontally and straightly, and a feed opening 90a of the suspension feed piping 90 for supplying pulp suspension PS of pulp feed tank 85 is provided oppositely in the overflow tank 81.

The pulp suspension PS is supplied and stored in the overflow tank 81 from the suspension feed piping 90, and when the overflow tank 81 is fully filled with pulp suspension PS, and when pulp suspension PS is further supplied, it overflows from the overflow unit 81a of the overflow tank 81 as indicated by arrow in FIG. 7, and flows down into the flat member 82 of the partition member 79 described below.

Figure 7:
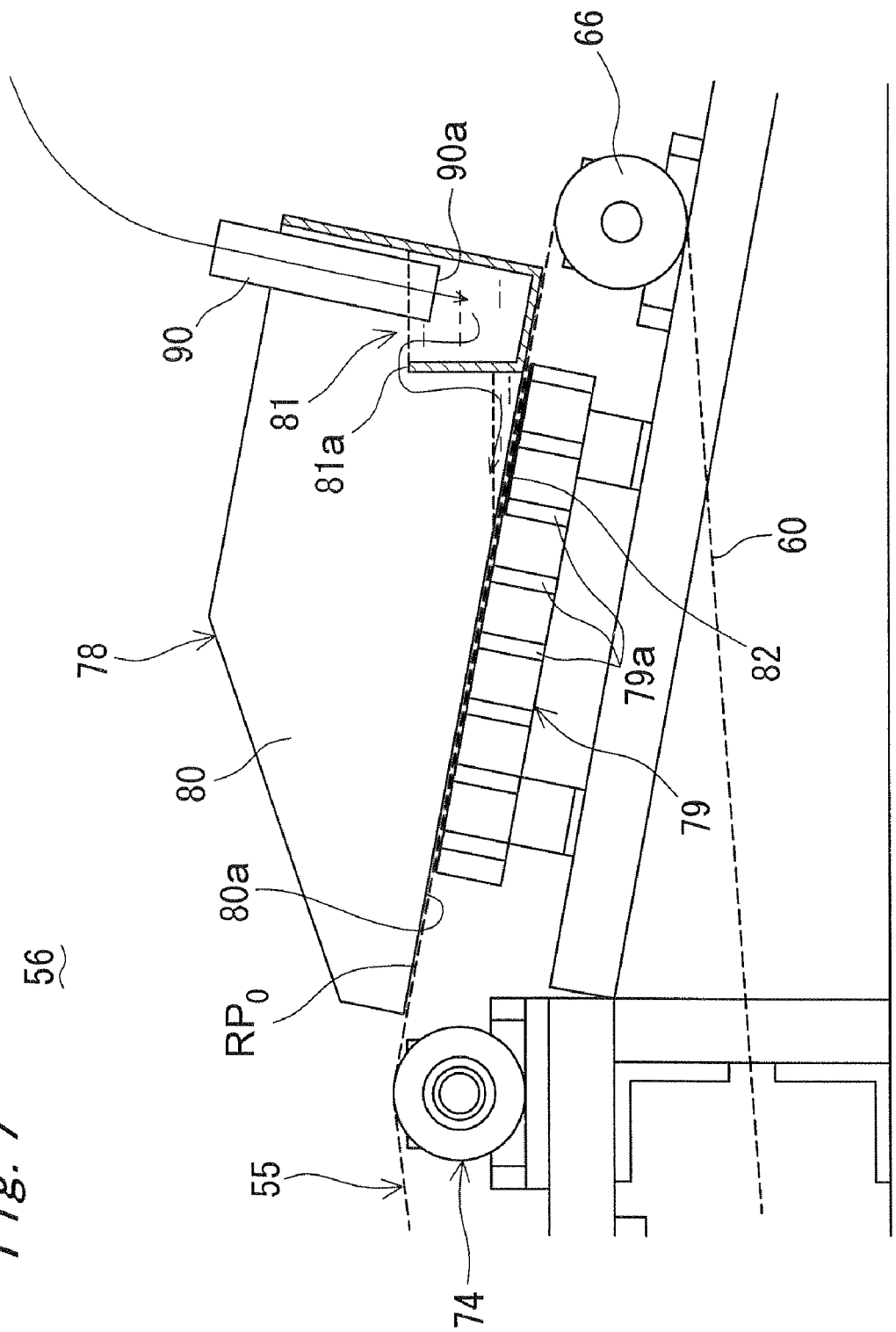
FIG. 7 is a partially cut-away front view of the pulp feeder.

The partition member 79 is disposed slidably at the downside of the mesh belt 60, and has a draining louver structure composed of a plurality of framework members 79a, 79a, . . . as shown in FIG. 6 and FIG. 7, having a shape and size capable of slidably supporting the entire width of the downside of the mesh belt 60, and the base end position of the louver structure is closed by the flat member 82.

The flat member 82 is provided at a position corresponding to the overflow tank 81 of the paper making frame 78, and is disposed, specifically as shown in FIG. 7, at a position corresponding to the flow-down position of the pulp suspension PS overflowing from the overflow tank 81, and thereby the mesh cells of the flow-down supply position of the pulp suspension PS in the mesh belt 60 are supported in closed state by the flat member 82.

At the upstream side of the pulp feed unit 56, a pulp feed tank 85 is provided for supplying the pulp suspension PS into the pulp feed unit 56.

The pulp suspension PS stored in the pulp feed tank 85 is detected by lower limit water level float switch 87 and upper limit water level float switch 88, and is supplied continuously into the overflow tank 81 of the pulp feed unit 56 by second suspension feed pump (suspension feed pump) 89.

The pulp suspension PS stored in the pulp feed tank 85 is thus supplied into the overflow tank 81 of the pulp feed unit 56 by the second suspension feed pump 89, and the pulp suspension PS supplied in the overflow tank 81 overflows from the overflow tank 81 as shown in FIG. 6 and FIG. 7, and flows down onto the flat member 82.

The pulp suspension PS is uniformly diffused on the upside of the mesh belt 60 by cooperative stagnant action by the main body frame 80 and partition member 79 of the paper making frame 78, and is conveyed together with the mesh belt 60 while maintaining the dimension specified by the main body frame 80 by the running action of mesh belt 60 in the arrow direction, and is dewatered by the gravitational filtering action of the mesh cells of the mesh belt 60, and wet paper RP0 is prepared. The filtered and dewatered white water W (pulp water of ultralow concentration filtered by the paper making net in the paper making process) is collected in the white water collect tank 20 of the water feed unit 13 as described above.

In the pulp feed unit 56, the running position of the mesh belt 60 is supported so as to be lateral and horizontal, that is, the upper contour line of the section vertical to the running direction of the mesh belt 60 may be in horizontal state. In such configuration, it is effective to prevent bias of stagnant state of pulp suspension PS in lateral width direction by cooperation of main body frame 80 and partition member 79, and thickness of adjusted wet paper RP0 is uniform in lateral width direction, and the thickness of the entire paper surface becomes uniform.

In the pulp feed unit 56, the running position of the mesh belt 60 is supported so as to be lateral and horizontal, that is, the upper contour line of the section vertical to the running direction of the mesh belt 60 may be in horizontal state. In such configuration, it is effective to prevent bias of stagnant state of pulp suspension PS in lateral width direction by cooperation of main body frame 80 and partition member 79, and thickness of adjusted wet paper RP0 is uniform in lateral width direction, and the thickness of the entire paper surface becomes uniform.

The dewatering roll unit 51 is a location of squeezing and dewatering the wet paper RP0 on the mesh belt 60 at the junction of the paper making process unit 50 and drying process unit 52 described below.

Specifically, the smooth surface belt 95 mentioned below of the drying process unit 52 at the downstream side and the mesh belt 60 of the paper making process unit 50 at the upstream side are disposed in upper and lower layers as shown in FIG. 1 and FIG. 4, and the upper and lower adjacent portions of the smooth surface belt 95 and mesh belt 60 form the junction, and the dewatering roll unit 51 rolls and squeezes the mesh belt 60 and smooth surface belt 95 from upper and lower sides.

The dewatering roll unit 51 mainly includes dewatering roll 70, press roll 71, and drive motor 72, and preliminary dewatering roll 74 and slurry preventive roll 75 are auxiliary components.

The dewatering roll 70 rolls on the mesh belt 60 from the lower side, and is specifically composed of a cylindrical roll 70a of high rigidity material, and a dewatering layer 70b of porous material of fine continuous pores wound on the outer circumference thereof. The dewatering layer 70b is made of material excellent in hydrophilic property, water absorption and water retaining property, and is preferably a porous material of fine continuous pores excellent in flexibility. Rolling structure of dewatering layer 70b on the cylindrical roll 70a includes single layer structure of rolling a relatively thick dewatering layer 70b once on the outer circumference of the cylindrical roll 70a, or fitting a cylindrical dewatering layer 70b to the cylindrical roll 70a, or multilayer structure of rolling a thin cylindrical dewatering layer 70b on the outer circumference of the cylindrical roll 70a in plural layers.

The dewatering roll 70 in the illustrated preferred embodiment is a single layer structure, that is, a cylindrical dewatering layer 70b of fine porous continuous foamed material having micron-size ultrafine continuous pores is fitted to the cylindrical outer circumference of the stainless steel cylindrical roll 70a.

The press roll 71 is to roll and press the upside of the smooth surface belt 95 of the drying process unit 52 described below. Specifically, it is a cylindrical roll of high rigidity material. The press roll 71 in the illustrated preferred embodiment is a stainless steel cylindrical roll.

The dewatering roll 70 and press roll 71 are specifically driven by and coupled to a single drive motor 72, and the both rolls 70, 71 are rotated and driven in interlock. In this case, the both rolls 70, 71 are rotated and controlled so that the outer circumferences of the both rolls 70, 71 may mutually roll and contact with a slight difference in rotating speed, on the contact surfaces of the mesh belt 60 and smooth surface belt 95 (the downside of mesh belt 60 and upside of smooth surface belt 95) rolling and squeezing in pressed state between the outer circumferences.

More specifically, the rotating speed of the press roll 71 is set slightly higher than the rotating speed of the dewatering roll 70, and hence the running speed of the smooth surface belt 95 is set higher than the running speed of the mesh belt 60. In such configuration, as mentioned below, when the wet paper RP0 squeezed and dewatered by the dewatering roll unit 51 is rolled and transferred from the upside of the mesh belt 60 of the lower side to the downside of the smooth surface belt 95 of the upper side, tension is applied to the wet paper RP0, and creasing of wet paper RP0 is effectively prevented.

The drive motor 72 is, in the illustrated preferred embodiment, used commonly with the drive motor 61 of the paper making process unit 50 as described below.

By driving of drive motor 72 (46), the both rolls 70, 71 roll and squeeze the both belts 60, 95 from upper and lower side in pressed state, and moisture M contained in the wet paper RP0 on the mesh belt 60 is absorbed and dewatered by the dewatering roll 70 through the mesh belt 60. The squeezed and dewatered white water W is collected in the white water collect tank 20 of the water feed unit 13.

A specific mechanism of squeezing and dewatering is explained by referring to FIG. 8A. By rotation of both rolls 70, 71, the mesh belt 60 and smooth surface belt 95 having the wet paper RP0 mounted on the upside are guided in between the rolls 70, 71 with the wet paper RP0 interposed therein, and rolled and squeezed from upper and lower sides in pressed state. As a result, the moisture M contained in the wet paper RP0 is squeezed out to the upstream side of the both rolls 70, 71 (the right side in the drawing), but since the smooth surface belt 95 of the upper side has a smooth surface not having pores, and the squeezed moisture M entirely passes through fine continuous pores in the mesh belt 60 at the lower side, and is absorbed in the dewatering layer 70b of the dewatering roll 70.

The preliminary dewatering roll 74 and slurry preventive roll 75 are provided to assist the squeezing and dewatering action of the press roll 71 and dewatering roll 70 in the dewatering roll unit 51.

The preliminary dewatering roll 74 is disposed, as shown in FIG. 1, so as to apply tension to the mesh belt 60 by rolling from the lower side at the upstream side of the dewatering roll unit 51.

The preliminary dewatering roll 74 is similar to the dewatering roll 70 in its specific structure, and is composed of a cylindrical roll 74a of high rigidity material, and a dewatering layer 74b of porous material of fine continuous pores wound on the outer circumference thereof. The preliminary dewatering roll 74 in the illustrated preferred embodiment is a single layer structure, that is, a cylindrical dewatering layer 74b of fine porous continuous foamed material having micron-size ultrafine continuous pores is fitted to the cylindrical outer circumference of the stainless steel cylindrical roll 74a.

The wet paper RP0 uniformly diffused on the upside of the mesh belt 60 and conveyed together with the mesh belt 60 is filtered and dewatered by the mesh belt 60, and is also absorbed and dewatered by the preliminary dewatering roll 74, and the squeezing and dewatering action of the press roll 71 and dewatering roll 70 is assisted preliminarily.

The slurry preventive roll 75 is disposed, as shown in FIG. 1 and FIG. 8B, so as to press the smooth surface belt 95 to the wet paper RP0 on the mesh belt 60 at the lower side, by rolling and pressing the smooth surface belt 95 from the upper side, near the upstream side of the dewatering roll unit 51.

Referring now to FIG. 8B, when the mesh belt 60 and smooth surface belt 95 having the wet paper RP0 mounted on the upside is rolled and squeezed from upper and lower side in pressed state by the dewatering roll 70 and press roll 71, the moisture M contained in the wet paper RP0 is squeezed out to the upstream side (right side in the drawing) of the both rolls 70, 71, and at the same time the moisture M held as a result of previous squeezing and dewatering of the dewatering roll 70 is also squeezed.

In this case, if the slurry preventive roll 75 is not provided, as shown in FIG. 8A, near the upstream side of the both rolls 70, 71, the intersecting angle of the smooth surface belt 95 at the upper side and the mesh belt 60 at the lower side (the angle enclosed as intersection of pressing points of both rolls 70, 71 by the both belts 60, 95) is relatively large, and hence the smooth surface belt 95 at the upper side is departed from the wet paper RP0 on the mesh belt 60 at the lower side. Hence, part M' of the total moisture M of the moisture contained in the wet paper RP0 squeezed to the upstream side of the both rolls 70, 71 and moisture held in the dewatering roll 70 is not absorbed by the dewatering roll 70 through the mesh belt 60, but may be absorbed in the wet paper RP0, and the wet paper RP0 may return to the state of slurry.

If the intersecting angle of the smooth surface belt 95 at the upper side and the mesh belt 60 at the lower side is not so large, such problem does not occur, and installation of slurry preventive roll 75 may be omitted.

The wet paper RP0 squeezed and dewatered by the dewatering roll unit 51 is rolled and transferred on the downside of the smooth surface belt 95 at the upper side from the upside of the mesh belt 60 at the lower side, and is conveyed together with the smooth surface belt 95, and dried by the drying process unit 52.

This transfer action is considered to occur from the smooth surface structure of the smooth surface belt 95. That is, the surface of the mesh belt 60 at the lower side is a rough surface having numerous continuous fine pores, while the surface of the smooth surface belt 95 at the upper side is a smooth surface not having pores. As a result, the wet paper RP0 slightly containing moisture is estimated to be attracted by the surface tension on the surface of the smooth surface belt 95.

As mentioned above, the running speed of the smooth surface belt 95 is set higher than the running speed of the mesh belt 60, and when the wet paper RP0 squeezed and dewatered by the dewatering roll unit 51 is transferred and rolled on the downside of the smooth surface belt 95 at the upper side from the upside of the mesh belt 60 at the lower side, since a tension is applied to the wet paper RP0 by the difference in speed, the wet paper RP0 is not creased, but is smoothly transferred onto the smooth surface belt 95.

The drying process unit 52 is a location for obtaining recycled paper RP after drying the wet paper RP0 manufactured and formed in the paper making process unit 50, and squeezed and dewatered in the dewatering roll unit 51, and mainly includes a drying conveyor 91 and a heating and drying unit 92.

The drying conveyor 91 is for conveying the wet paper RP0 while heating and drying after being squeezed and dewatered by the dewatering roll unit 51, and is provided with the smooth surface belt 95 and a drive motor 96 for moving and driving the smooth surface belt 95.

The smooth surface belt 95 is for conveying the wet paper RP0 while heating drying, and is specifically an endless belt formed of plate members of smooth surface structure of specified width connected and formed in a ring of specified length.

The specified width is set slightly larger than the width of the recycled paper RP to be manufactured same as in the mesh endless belt 60. The plate material of the smooth surface structure can be finished to an appropriate smooth surface on one side of the wet paper RP0, so as to withstand heating action by the heating and drying unit 97 described below, and is preferably made of elastic heat resistant material such as fluoroplastic or stainless steel, and a fluoroplastic belt is used in the illustrated preferred embodiment. The specified length is long enough so that the wet paper RP0 may be heated and dried to be a completed product of recycled paper RP, and is set to a size enough to be accommodated in the storing space of the drying belt conveyor 42 in the apparatus case 5.

The smooth surface belt 95 is rotatably suspended and supported by way of drive roller 100, follower rollers 101, 102, press roll 71, slurry preventive roll 75, smooth surface finishing rolls 103,103, and preliminary dewatering roll 74 as shown in FIG. 1 and FIG. 4, and is driven by and coupled to the drive motor 96 by way of the drive roller 100.

The drive motor 96 for driving the smooth surface endless belt 95 is commonly used as the driving source of the paper making net conveyor 40 and dewatering roll 41 as mentioned above, and this common structure or drive coupling mechanism is shown in FIG. 6.

In FIG. 4, reference numeral 105 is a power transmission gear, numeral 106 is a sprocket, numeral 107 is a power transmission chain applied between the sprockets 106, 106, and 78 is a power transmission shaft.

The gear ratio of power transmission gears 105, 105, . . . and sprockets 106, 106, . . . is determined so that all of the drive roller 100, follower rollers 101,102, press roll 71, slurry preventive roll 75, smooth surface finishing rolls 103,103, and preliminary dewatering roll 74 may roll and contact on the smooth surface endless belt 95 substantially at an identical peripheral speed because the drive source is a single drive motor 96.

The heating and drying unit 92 is a location for heating and drying the wet paper RP0 on the smooth surface belt 95, and includes a heater plate 109 disposed somewhere in the running route of the smooth belt 95 as a heating unit.

The heater plate 109 in the illustrated preferred embodiment is provided in the horizontal running portion in the running route of the smooth surface belt 95, and more specifically provided in contact with the opposite side of the upside of the holding side of the wet paper RP0, that is, on the downside, on the smooth surface belt 95. Hence, the wet paper RP0 on the smooth surface belt 95 is heated and dried indirectly by the smooth surface belt 95 heated by the heater plate 109.

In the running route of the smooth surface belt 95, the two smooth surface finishing rolls 103, 103 are disposed. Specifically, these smooth surface finishing rolls 103, 103 are disposed parallel opposite to the heater plate 109 in the horizontal running portion in the running route of the smooth surface belt 95.

The both smooth surface finishing rolls 103, 103 sequentially roll and press the wet paper RP0 on the smooth surface belt 95, and finish the one side and opposite side of the wet paper RP0 contacting with the surface of the smooth surface belt 95 to a proper smooth surface.

In the illustrated preferred embodiment, two smooth surface finishing rolls 103, 103 are provided, but the number of smooth surface finishing rolls may be properly increased or decreased depending on the purpose.

At the downstream side of the heating and drying unit 92 of the smooth surface belt 95, a stripping member 110 is provided. Specifically, the stripping member 110 is a heat resistant elastic spatula, and the stripping member 110 of the illustrated preferred embodiment is made of an elastically deformable stainless steel plate of about 0.1 to 3 mm in thickness coated with Teflon (registered trademark) on the outer circumference, and its base end is supported at the fixed side (not shown), and its leading end edge 110*a* elastically abuts and stops on the surface of the smooth surface belt 95.

The paper dried and conveyed on the smooth surface belt 95, that is, the recycled paper RP is sequentially separated from the holding side of the smooth surface belt 95 by the leading end edge 110*a* of the stripping member 110.

In this relation, at the downstream side of the stripping member 110, that is, at the terminal end position of running route of the smooth surface belt 95 or the terminal end position of the drying process unit 52, a size cutter 111 is provided for cutting the recycled paper RP separated from the smooth surface belt 95 to a specified size and shape (only the length is shown in the drawing). The size cutter 111 is not particularly shown in the drawing, but may be realized by known structure, such as double-side slitter, or guillotine cutter by solenoid.

The recycled paper RP separated from the smooth surface belt 95 is cut to specified length by the size cutter 111 (vertical size of A4 format in the illustrated preferred embodiment), and the recycle paper RP of proper size is obtained, and discharged from the discharge port 5*b* of the apparatus case 5. Cutting in specified length is realized by measuring the belt feed rate of the smooth surface belt 95 by proximity switch, encoder and other sensors.

The control section 4 automatically controls the operation of driving parts of the macerating unit 10 and paper making section 3 by cooperating mutually, and is composed of a microcomputer specifically including CPU, ROM, RAM, and I/O ports.

The control section 4 stores programs for continuously executing the pulp manufacturing process of the pulp making section 2 and the paper making process of the paper making section 3, and also stores preliminarily various data including the driving time of agitating device 12 in the macerating unit 10, operation timing of water feed unit 13, running speed of conveyors 40, 42 in the paper making section 3, driving time of heating and drying unit 92, and operation timing of size cutter 111, through keyboard or selective input setting.

Various devices are electrically connected to the control section 4 as mentioned above, such as float switches 28, 29, 43, 87, 88, and drive units 17, 21, 44, 61 (72, 96), 89, 105, 111, and the control section 4 controls these drive units 17, 21, 44, 61 (72, 96), 89, 105, 111, according to the measured values and data.

The used paper recycling apparatus 1 having such configuration is started by turning on the power, and the control section 4 automatically controls these drive units in mutual relation, and executes the following processes, that is, the used paper UP, UP, . . . charged the inlet 5*a* of the apparatus case 5 are macerated and mashed in the pulp making section 2, macerating unit 10, and mashing unit 11, and used paper pulp UPP is manufactured, and this used paper pulp UPP is manufactured by the paper making process unit 50, dewatering roll unit 51, and drying process unit 52 of the paper making section 3, and is regenerated as recycled paper RP, and discharged in the recycled paper receive tray 7 from the outlet 5*b* of the apparatus case 5.

In the used paper recycling apparatus 1 having such configuration, the paper making section (paper making device) 3 has a paper making process unit 50 for manufacturing wet paper from slurry pulp suspension PS sent from the pulp making section 2 in the preceding process, and this paper making section 50 includes a paper making conveyor 55 for manufacturing and conveying the pulp suspension PS, and this paper making conveyor 55 is disposed and composed so that the mesh belt 60 of paper making mesh structure of numerous meshes for filtering and dewatering the pulp suspension PS may run straightly toward its running direction, and the paper making process length L in the mesh belt 60 is set within a range of straight running direction length of the mesh belt 60 in the apparatus case 5 of furniture size, hence brings about the following effects, and it presents a used paper recycling apparatus that can be installed not only in a large office, but also in a small shop or a room in general household, is friendly to the environment and low in running cost, capable of preventing leak of confidential information, private information, and other information, and keeping a high confidentiality.

(1) In the apparatus case 5 of furniture size, the apparatus includes the pulp making section 2 for manufacturing used paper pulp UPP by macerating and mashing used paper UP, the paper making section (paper making device) 3 for manufacturing recycled paper RP by making the used paper pulp UPP manufactured in the pulp making section 2, and a used paper recycling apparatus 1 of small size and simple structure is realized, and hence without discarding the used paper UP, the used paper UP can be recycled at the site of origin, and disposal of used paper UP is decreased, and not only the refuse problems can be solved, but also the limited resources can be utilized effectively.

In particular, from confidential problems, recycling of private and confidential used paper UP is not promoted, and by recycling the used paper UP at the site of origin, the resources can be utilized effectively.

(2) At the site of origin of used paper UP, a compact used paper recycling system having a same function as large scale system installed in paper making plant or used paper recycling plant is installed, and used paper UP can be recycled continuously in a closed circuit in a small shop or general household, and refuse collection and transportation expenses and incineration and other costs are saved, and it is very economical.

(3) Moreover, the apparatus structure is compact, and it can be installed not only in large office, but also in small shop or general household, and from this point of view, too, leak of confidential information and private information can be securely prevented.

(4) Being installed at the site of origin of used paper UP, the pulp making section 2 manufactures used paper pulp UPP by macerating and mashing used paper UP to obtained used paper pulp UPP, and the paper making section 3 manufactures recycled paper RP by making the used paper pulp UPP to obtain recycled paper RP, and hence the used paper UP can be recycled and reused at the site of origin, and it is free from diffusion of characters, line drawings and other information printed in used paper UP to outside of the site of origin of used paper UP, and from this point of view, too, leak of confidential information and private information can be securely prevented, and not only the high confidentiality is assured, but also the limited resources can be utilized effectively.

That is, by using the used paper recycling apparatus 1 of the preferred embodiment having the paper making device 3 as the paper making section, it is free from risk of external diffusion of various information from the closed system of its use (for example, school, hospital, city office, law firm, patent office, general household).

In other words, in the case of a conventional shredder, if the used paper is shredded into small chips, and the printed characters and patterns are not legible, the shredded chips are incinerated, and external diffusion cannot be prevented perfectly. In this regard, the waste chips may be stored within an internal warehouse, but storing place is needed, and the resources are used only once and are not utilized effectively.

By contrast, according to the used paper recycling apparatus 1 of the preferred embodiment, the information printed on the used paper is not diffused outside of the closed system, and the resources can be utilized effectively.

As the invention may be embodied in several forms without departing from the spirit of essential characteristics thereof, the present preferred embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A paper manufacturing apparatus for used paper recycling apparatus of furniture size small enough to be installed at the site of origin of used paper, for manufacturing recycled paper from used paper pulp manufactured in a pulp manufacturing device in preceding process, comprising:
    a paper making process unit for manufacturing wet paper from slurry pulp suspension containing water and used paper pulp sent from the pulp manufacturing device,
    a drying process unit for manufacturing recycled paper by drying the wet paper manufactured and formed in the paper making process unit, and
    a dewatering roll unit for squeezing and dewatering the wet paper at the junction of the paper making process unit and the drying process unit,
    wherein the paper making process unit includes a paper making conveyor for manufacturing and conveying the pulp suspension, and a pulp feed unit for supplying the pulp suspension from the pulp manufacturing device to the paper making conveyor,
    the paper making conveyor is composed of mesh belt of paper making mesh structure of numerous meshes for filtering and dewatering the pulp suspension disposed to run straightly toward its running direction, and
    the paper making process length in the mesh belt is set in a range of straight running direction length of the mesh belt in the apparatus case of furniture size, and
    the pulp feed unit and the dewatering roll unit are provided at a starting end position and a finishing end position of the paper making process in the mesh belt, respectively,
    wherein the paper making process length of the mesh belt is set sufficiently for manufacturing a proper weight of paper from the pulp suspension in relation to the filtering and dewatering rate of the paper making mesh structure and the running speed of the mesh belt, and small enough so that the paper making conveyor having the mesh belt may be accommodated in the apparatus case of furniture size, and
    wherein the mesh belt is disposed upward, obliquely and straightly toward its running direction.

2. The paper manufacturing apparatus for used paper recycling apparatus of claim 1,
    wherein the upward inclination angle of the mesh belt is set at 3 degrees to 12 degrees.

3. The paper manufacturing apparatus for used paper recycling apparatus of claim 1,
    wherein the mesh cells of the mesh belt are set at 25 meshes to 80 meshes.

4. The paper manufacturing apparatus for used paper recycling apparatus of claim 1,
    wherein the running speed of the mesh belt is set at 0.1 in/min to 1 m/min.

5. The paper manufacturing apparatus for used paper recycling apparatus of claim 1,
    wherein the paper making conveyor includes the mesh belt of endless belt form for manufacturing and conveying the pulp suspension, and a drive motor for driving this mesh belt.

6. The paper manufacturing apparatus for used paper recycling apparatus of claim 1,
    wherein the paper making process unit is installed at start end position of paper making process of the paper making conveyor, and includes a pulp feeder for supplying the pulp suspension from the pulp manufacturing device into the paper making conveyor, and
    the pulp suspension is spread and supplied uniformly on the upside of the mesh belt of the paper making conveyor by this pulp feeder.

7. The paper manufacturing apparatus for used paper recycling apparatus of claim 1,
    wherein the dewatering roll unit is designed to roll and squeeze the mesh belt of the paper making process unit and the smooth surface belt of the drying process unit, flatly from both upper and lower sides, and squeeze and dewater the wet paper on the mesh bet.

8. The paper manufacturing apparatus for used paper recycling apparatus of claim 7,
    wherein the dewatering roll unit includes a dewatering roll rolling and contacting on the lower side of the mesh belt of the paper making process unit, a press roll for rolling and pressing the upper side of the smooth surface belt of the drying process unit oppositely to the dewatering roll, and a drive motor for rotating and driving these two rolls in interlock, and
    the mesh belt and smooth surface belt are rolled and squeezed flatly from both upper and lower sides by the both rolls rotated and driven by this drive motor, and the moisture contained in the wet paper or the mesh belt is absorbed by the dewatering roll by way of the mesh belt.

9. The paper manufacturing apparatus for used paper recycling apparatus of claim 1,
    wherein the drying process unit includes a smooth surface belt of endless belt form for receiving and conveying the wet paper manufactured and formed in the paper making process unit, and a drive motor for driving this smooth surface belt, and
    the smooth surface belt has a smooth surface for smoothing the surface of the wet paper sent from the paper making process unit.

10. The paper manufacturing apparatus for used paper recycling apparatus of claim 9,
    wherein the drying process unit includes a heating and drying process unit for heating and drying the wet paper on the smooth surface belt.

11. The paper manufacturing apparatus for used paper recycling apparatus of claim 1,
    wherein the paper making process unit, dewatering roll unit, and drying process unit are driven by a common drive source.

12. The paper manufacturing apparatus for used paper recycling apparatus of claim 1,
    wherein the paper making conveyor includes the mesh belt of endless belt form for manufacturing and conveying the pulp suspension, and a drive motor for driving this mesh belt.

13. The paper manufacturing apparatus for used paper recycling apparatus of claim 1, wherein the paper making process unit is installed at start end position of paper making process of the paper making conveyor, and includes a pulp feeder for supplying the pulp suspension from the pulp manufacturing device into the paper making conveyor, and the pulp suspension is spread and supplied uniformly on the upside of the mesh belt of the paper making conveyor by this pulp feeder.

14. A used paper recycling apparatus of furniture size small enough to be installed at the site of origin of used paper, comprising:

a pulp manufacturing section for macerating and mashing the used paper and manufacturing used paper pulp accommodated in an apparatus case of furniture size, a paper making section for manufacturing recycled paper from the used paper pulp manufactured in this pulp manufacturing section, and a control section for driving and controlling the pulp manufacturing section and paper making section in interlock, wherein the paper making section includes a paper making process unit for making wet paper from slurry pulp suspension containing water and used paper pulp sent from the pulp making section, a drying process unit for manufacturing recycled paper by drying the wet paper manufactured and formed in the paper making process unit, and a dewatering roll unit for squeezing and dewatering the wet paper at the junction of the paper making process unit and the drying process unit, the paper making process unit includes a paper making conveyor for manufacturing and conveying the pulp suspension, and a pulp feed unit for supplying the pulp suspension from the pulp manufacturing device to the paper making conveyor, this paper making conveyor is composed of a mesh belt of paper making mesh structure of numerous mesh cells for filtering and dewatering the pulp suspension disposed so as to run straightly toward its running direction, and the paper making process length in the mesh belt is set in a range of straight running direction length of the mesh belt in the apparatus case of furniture size, and the pulp feed unit and the dewatering roll unit are provided at a starting end position and a finishing end position of the paper making process in the mesh belt, respectively, wherein the paper making process length of the mesh belt is set sufficiently for manufacturing a proper weight of paper from the pulp suspension in relation to the filtering and dewatering rate of the paper making mesh structure and the running speed of the mesh belt, and small enough so that the paper making conveyor having the mesh belt may be accommodated in the apparatus case of furniture size, and wherein the mesh belt is disposed upward, obliquely and straightly toward its running direction.

* * * * *